US008145578B2

(12) United States Patent  
Pershing et al.

(10) Patent No.: US 8,145,578 B2
(45) Date of Patent: Mar. 27, 2012

(54) AERIAL ROOF ESTIMATION SYSTEM AND METHOD

(75) Inventors: Chris Pershing, Redmond, WA (US); Dave Carlson, Anaheim, CA (US)

(73) Assignee: Eagel View Technologies, Inc., Redmond, WA (US)

( * ) Notice: Subject to any disclaimer, the term of this patent is extended or adjusted under 35 U.S.C. 154(b) by 594 days.

(21) Appl. No.: 12/148,439

(22) Filed: Apr. 17, 2008

(65) Prior Publication Data

US 2008/0262789 A1 Oct. 23, 2008
US 2010/0179787 A2 Jul. 15, 2010

Related U.S. Application Data

(60) Provisional application No. 60/925,072, filed on Apr. 17, 2007.

(51) Int. Cl.
| | |
|---|---|
| G06F 17/00 | (2006.01) |
| G06F 7/60 | (2006.01) |
| G06F 17/10 | (2006.01) |
| G06G 7/00 | (2006.01) |
| G06Q 40/00 | (2012.01) |
| G06Q 50/00 | (2012.01) |

(52) U.S. Cl. ............... 705/400; 703/2; 705/4; 705/313
(58) Field of Classification Search ............ 705/400, 705/4, 313; 703/2
See application file for complete search history.

(56) References Cited

U.S. PATENT DOCUMENTS

| 5,247,356 A | 9/1993 | Ciampa | 358/109 |
| 5,633,995 A | 5/1997 | McClain | 395/119 |

(Continued)

FOREIGN PATENT DOCUMENTS

AU 2008230031 B8 11/2009

(Continued)

OTHER PUBLICATIONS

Precigeo.com "Welcome to precigeo(TM)"; pp. 6-9, "How predigeoRisk Works" and pp. 10-11, "Welcome to precigeoRisk" combined as 1 document, 11 pages. pp. 6-11 downloaded Aug. 14, 2010 from Way Back Machine dated Dec. 12, 2006.*

(Continued)

*Primary Examiner* — John Hayes
*Assistant Examiner* — David J Clark
(74) *Attorney, Agent, or Firm* — Seed IP Law Group PLLC

(57) ABSTRACT

A system that allows the remote measurement of the size, geometry, pitch and orientation of the roof sections of a building and then uses the information to provide an estimate to repair or replace the roof, or to install equipment thereon. The system includes an aerial image file database that shows aerial images of buildings in a designated area according to address. The slope and orientation images are typically oblique perspective views and top plan views of the buildings in the area. The system also includes an image analysis and calibration feature that enables the viewer to closely estimate the size, geometry and orientation of the building's roof sections. The information can then be used to prepare a cost estimate for the repair or replacement of the roof or installation of roof equipment. By simply inputting the potential customer's address, the company is able to determine the size, geometry, pitch and orientation of the roof sections of the building at that address, and then quickly provide an accurate estimate to the customer.

52 Claims, 9 Drawing Sheets

U.S. PATENT DOCUMENTS

| | | | | |
|---|---|---|---|---|
| 6,385,541 | B1 | 5/2002 | Blumberg et al. | 701/213 |
| 6,396,491 | B2 | 5/2002 | Watanabe et al. | 345/419 |
| 6,446,053 | B1 | 9/2002 | Elliott | 705/400 |
| 6,496,184 | B1 | 12/2002 | Freeman et al. | 345/419 |
| 6,636,803 | B1 | 10/2003 | Hartz, Jr. et al. | 701/208 |
| 6,836,270 | B2 | 12/2004 | Du | 345/419 |
| 6,980,690 | B1 | 12/2005 | Taylor et al. | 382/154 |
| 7,003,400 | B2 | 2/2006 | Bryant | 702/5 |
| 7,006,977 | B1 | 2/2006 | Attra et al. | 705/1 |
| 7,133,551 | B2 | 11/2006 | Chen et al. | 382/154 |
| 7,305,983 | B1* | 12/2007 | Meder et al. | 126/621 |
| 7,324,666 | B2 | 1/2008 | Zoken et al. | 382/113 |
| 7,343,268 | B2 | 3/2008 | Kishikawa | 703/1 |
| 7,424,133 | B2 | 9/2008 | Schultz et al. | 382/106 |
| 7,873,238 | B2 | 1/2011 | Schultz et al. | 382/284 |
| 8,078,436 | B2 | 12/2011 | Pershing et al. | 703/2 |
| 2002/0154174 | A1 | 10/2002 | Redlich et al. | 345/848 |
| 2003/0014224 | A1 | 1/2003 | Guo et al. | 703/1 |
| 2003/0028393 | A1 | 2/2003 | Coulston et al. | 705/1 |
| 2003/0115163 | A1 | 6/2003 | Moore et al. | 705/500 |
| 2003/0171957 | A1 | 9/2003 | Watrous | 705/4 |
| 2003/0233310 | A1 | 12/2003 | Stavrovski | 705/37 |
| 2004/0047498 | A1 | 3/2004 | Mulet-Parada et al. | 382/128 |
| 2004/0105090 | A1 | 6/2004 | Schultz et al. | 356/141.5 |
| 2004/0105573 | A1 | 6/2004 | Neumann et al. | 382/103 |
| 2004/0220906 | A1 | 11/2004 | Gargi et al. | 707/3 |
| 2005/0203768 | A1 | 9/2005 | Florance et al. | 705/1 |
| 2005/0288959 | A1 | 12/2005 | Eraker et al. | 705/1 |
| 2006/0200311 | A1 | 9/2006 | Arutunian et al. | 701/210 |
| 2006/0232605 | A1 | 10/2006 | Imamura | 345/619 |
| 2006/0262112 | A1 | 11/2006 | Shimada | 345/419 |
| 2006/0265287 | A1* | 11/2006 | Kubo | 705/26 |
| 2007/0150366 | A1* | 6/2007 | Yahiro et al. | 705/26 |
| 2007/0179757 | A1* | 8/2007 | Simpson | 703/1 |
| 2008/0021683 | A1 | 1/2008 | Rahmes et al. | 703/7 |
| 2008/0105045 | A1 | 5/2008 | Woro | 73/170.27 |
| 2008/0123994 | A1 | 5/2008 | Schultz et al. | 382/284 |
| 2008/0204570 | A1 | 8/2008 | Schultz et al. | 348/22.1 |
| 2008/0221843 | A1 | 9/2008 | Shenkar et al. | 703/1 |
| 2008/0231700 | A1 | 9/2008 | Schultz et al. | 348/144 |
| 2008/0310756 | A1* | 12/2008 | Tao et al. | 382/285 |
| 2009/0097744 | A1 | 4/2009 | Schultz et al. | 382/167 |
| 2009/0132210 | A1 | 5/2009 | Royan et al. | 703/1 |
| 2009/0132436 | A1 | 5/2009 | Pershing et al. | 705/400 |
| 2009/0141020 | A1 | 6/2009 | Freund et al. | 345/419 |
| 2009/0304227 | A1 | 12/2009 | Kennedy et al. | 382/100 |
| 2010/0110074 | A1 | 5/2010 | Pershing | 345/423 |
| 2010/0114537 | A1 | 5/2010 | Pershing | 703/1 |
| 2011/0187713 | A1 | 8/2011 | Pershing et al. | 345/420 |

FOREIGN PATENT DOCUMENTS

| | | |
|---|---|---|
| EP | 2 251 833 A2 | 11/2010 |
| WO | 00/29806 | 5/2000 |
| WO | WO2005/124276 | 12/2005 |
| WO | WO2006/040775 | 4/2006 |
| WO | WO2006/090132 | 8/2006 |
| WO | WO 2011/094760 A2 | 8/2011 |

OTHER PUBLICATIONS

Pictometry® "Frequently Asked Questions" www.pictometry.com/faq.asp per wayback machine (http://replay.waybackmachine.org/20050801231818/http://www.pictometry.com/faq.asp) dated Aug. 1, 2005.*

"Roof with a View"; Mann, Will; Contract Journal v431n6552; Nov. 23, 2005; pp. 29 from Dialog.*

Lueders letter dated Feb. 10, 2009, 3 pages.

"Pictometry—In the News," http://204.8.121.114/pressrelease%20archived/pressrelease_aec.asp, retrieved Feb. 6, 2009, 3 pages, Exhibit A.

"YouTube—Pictometry Online Demo," http://www.youtube.com/watch?v=jURSK7o0OD0, retrieved Feb. 6, 2009, 1 page, Exhibit B.

YouTube Video—Pictometry Online Demo—DVD, Feb. 25, 2010.

Schutzberg et al., "Microsoft's MSN Virtual Earth: The Map is the Search Platform," Directions Magazine, http://www.directionsmag.com/article.php?article_id=873&trv=1, retrieved Feb. 6, 2009, 10 pages, Exhibit C.

Miller, M., et al., "Miller's Guide to Framing and Roofing," 2005, McGraw Hill, pp. 131-136 and 162-163, Exhibit D.

Gulch, E., et al., "On the Performance of Semi-Automatic Building Extraction," In the International Archives of Photogrammetry and Remote Sensing, vol. 32, 1998, 8 pages, Exhibit F.

"Autodesk—Autodesk ImageModeler—Features," http://usa.autodesk.com/adsk/servlet/index?siteID=123112&id=115639..., retrieved Sep. 30, 2008, 1 page.

"Automatic House Reconstruction," http://www.vision.ee.ethz.ch/projects/Amobe_I/recons.html, retrieved Sep. 29, 2008, 7 pages.

Baillard, C. et al., "Automatic reconstruction of piecewise planar models from multiple views," CVPR99, vol. II, 1999, pp. 559-565.

Bignone, F. et al., "Automatic Extraction of Generic House Roofs from High Resolution Aerial Imagery," In: Proc. ECCV, 1996, 12 pages.

Chevrier, C. et al., "Interactive 3D Reconstruction for Urban Areas," CAAD Futures, 2001, pp. 1-13.

Debevec, Paul E. et al., "Modeling and Rendering Architecture from Photographs: A hybrid geometry- and image-based approach," www.cs.berkeley.edu/~malik/papers/debevecTM96.pdf., 1996, 10 pages.

Faugeras, O. et al., "3D Reconstruction of Urban Scenes from Sequences of Images," INRIA, No. 2572, Jun. 1995, 26 pages.

Henricsson, O. et al., "3-D Building Reconstruction with ARUBA: A Qualitative and Quantitative Evaluation," ftp://igpho.ethz.ch/pub/manos/papers/HenrO97Ascona.pdf, 1997, 12 pages.

Noronha, S. et al., "Detection and Modeling of Buildings from Multiple Aerial Images," IEEE Trans. on Pattern Analysis and Machine Intelligence, vol. 23, Issue 5, pp. 501-518, May 2001.

"PhotoModeler—Measure and Model Real-World Objects from Photographs," http://www.photomodeler.com/products/photomodeler.htm, retrieved Sep. 30, 2008, 2 pages.

Poullis, C. et al., "Photogrammetric Modeling and Image-Based Rendering for Rapid Virtual Environment Creation," http://handle.dtic.mil/100.2/ADA433420, 1998, 7 pages.

Scholze, S. et al., "A Probabilistic Approach to Building Roof Reconstruction Using Semantic Labelling," Pattern Recognition, Springer Berlin/Heidelberg, vol. 2449/2002, 2002, 8 pages.

Ziegler, R, et al. "3D Reconstruction Using Labeled Image Regions," Mitsubishi Electric Research Laboratories, http://www.merl.com, 2003, 14 pages.

Delaney, "Searching for Clients from Above", The Wall Street Journal, Jul. 31, 2007, 3 pages.

Precigeo, "Welcome to precigeo™", www.precigeo.com, 2006, downloaded Feb. 26, 2010, 5 pages.

Notice of Allowance, for U.S. Appl. No. 12/253,092, mailed Oct. 14, 2011, 30 pages.

Transcription of points of potential interest in the Youtube video entitled, "Pictometry Online Demo," retrieved Feb. 25, 2010, DVD originally filed in Information Disclosure Statement dated Feb. 26, 2010.

Pictometry, "Electronic Field Study™ Getting Started Guide," Version 2.7, Jul. 2007, 15 pages.

Pictometry, "FAQs," retrieved on Aug. 8, 2011, from http://www.web.archive.org/web/20080922013233/http:/www.pictometry.com/about_us/faqs.sht..., 3 pages.

Pictometry Online, "Government," retrieved Aug. 8, 2011, from http://web.archive.org/web/20081007111115/http:/www.pictometry.com/government/prod..., 3 pages.

Australian Office Action for Australian Application No. 2010201839, dated Apr. 14, 2011, 2 pages.

International Search Report for International Application No. PCT/US11/23408, mailed Aug. 11, 2011, 2 pages.

Office Action, for U.S. Appl. No. 12/253,092, mailed May 10, 2011, 26 pages.

Office Action for U.S. Appl. No. 12/467,244, mailed Aug. 26, 2011, 17 pages.

Office Action for U.S. Appl. No. 12/467,250, mailed Sep. 7, 2011, 14 pages.

Written Opinion, for International Application No. PCT/US11/23408, mailed Aug. 11, 2011, 5 pages.

Minialoff, R., "Introduction to Computer Aided Design", Apr. 2000, 4 pages.

RoofCAD, "Satellite Takeoff Tutorial—Pitched Roof" received Jan. 31, 2012, 25 pages.

Drawing received Jan. 31, 2012.

* cited by examiner

AERIAL ROOF ESTIMATION SYSTEM AND METHOD

This is a utility patent application which claims benefit of U.S. Provisional Application No. 60/925,072 filed on Apr. 17, 2007

BACKGROUND OF THE INVENTION

1. Field of the Invention

This invention relates to systems and methods for estimating construction projects, and more particularly, to such systems and methods that allow estimates involving roofs on buildings to be created remotely.

2. Description of the Related Art

The information provided below is not admitted to be part of the present invention, but is provided solely to assist the understanding of the reader.

Homeowners typically ask several roofing contractors to provide written estimates to repair or replace a roof on a house. Heretofore, the homeowners would make an appointment with each roofing contractor to visit the house to determine the style of roof, take measurements, and to inspect the area around the house for access and cleanup. Using this information, the roofing contractor then prepares a written estimate and then timely delivers it to the homeowner. After receiving several estimates from different roofing contractors, the homeowner then selects one.

There are factors that impact the roofing contractor's ability to provide a timely written estimate. One factor is the size of the roof contractor's company and the location of the roofing jobs currently underway. Most roof contractors provide roofing services and estimates to building owners over a large geographical area. Larger roof contractor companies hire one or more trained individuals who travel throughout the entire area providing written estimates. With smaller roofing contractors, the owner or a key trained person is appointed to provide estimates. With both types of companies, roofing estimates are normally scheduled for buildings located in the same area on a particular day. If an estimate is needed suddenly at a distant location, the time for travel and the cost of commuting can be prohibitive. If the roofing contractor is a small company, the removal of the owner or key person on a current job site can be time prohibitive.

Another factor that may impact the roofing contractor's ability to provide a written estimate is weather and traffic.

Recently, solar panels have become popular. In order to install solar panels, the roof's slope, geometrical shape, and size as well as its orientation with respect to the sun all must be determined in order to provide an estimate of the number and type of solar panels required. Unfortunately, not all roofs on a building are proper size, geometrical shape, or orientation for use with solar panels.

What is needed is a system that allows a roof to be quickly and easily measured and that does not require the estimator to physically travel to the building to take measurements. Such measurements can then be used to prepare an estimate to repair or replace the roof or install equipment thereon.

SUMMARY OF THE INVENTION

These and other objects are met by the system and method disclosed herein that allows a company that needs the sizes, dimensions, slopes and orientations of the roof sections on a building in order to provide a written estimate. The system includes the use of a roof estimating software program and a location-linked, image file database. During use, the physical address or location information of the building is inputted into the program which then presents aerial images of roof sections on the building at the specific address location. An overhead aircraft, a balloon, or satellite may produce the aerial images. An image analysis and calibration is then performed either manually or via a software program that determines the geometry, the slopes, the pitch angles, and the outside dimensions of the roof sections. The images may also include the land surrounding the roof sections and building which the estimating company can use to factor in additional access or clean-up costs.

In the first embodiment of the system, the roof company is contacted by a potential customer requesting an estimate for repair or replacement of a roof on their building. The roof company uses a local computer with an estimating software program loaded into its working memory to access an image file database located on the computer or on a remote server connected via a wide area network to the local computer. The image file database contains image files of various buildings in the roof company's service area. When a request for an estimate is received from a potential customer, the roof company enters the customer's address into the software program and aerial images of the building are then presented to the roof company. The roof company then manually measures or uses a roof estimation software program to determine the slopes, dimensions, and other relevant geometric information of the roof sections on the buildings. From these determinations, the overall shape, slopes and square footage of the roof sections are determined and a report is produced. After the report has been prepared, the images are reviewed again for special access and cleanup tasks which can be added to the final estimate before transmission to the potential customer.

In another embodiment, the roof estimate software program and image file database are both stored on one or more remote computers and accessed by the roof company via a wide area network. The roof company uses an assigned user name and password to log onto the website and access the computer. After logging on, the roof company logs then submits the new customer's address, other relevant job related information, and a request for a report from the roof estimation service. An estimation service associated with the website uses the address information to obtain the images of the roof sections on the building(s) and uses the roof estimation software program and calibration module to determine the relevant geometry, pitch angles, dimensions, and surface areas of the building's roof. The service then produces and sends a report to the roof company. The company then uses the report to prepare a final estimate that is then delivered to the potential customer.

In another embodiment of the system, a roof estimating website is designed to receive requests for roof estimates directly from potential customers in a region. The estimation service that owns and operates the website is associated with various roof companies that provide roof-related services in the region serviced by the website. When a potential customer contacts the website and requests an estimate for a roof repair, replacement or installation of equipment, the potential customer's name, address, and contact information is first submitted on the website. The estimation service representative, enters the address of the building into the roof estimation software program. The aerial images of the buildings are then obtained and analyzed by the service representative to extract the relevant geometric information about the structures. A report containing the geometric information obtained from the aerial images and other relevant project related information supplied by the potential customer are transmitted to roof companies associated with the estimation service. The roof company reviews the information then prepares an estimate which then can be uploaded to the roof estimating website server which then forwards the estimate to the potential customer, or sends from the roof company directly via email, fax or mail to the potential customer.

In another embodiment, a service associated with the roof estimate website uses the image file database and roof estimate software to pre-emptively calculate and store the dimensions, areas, pitch angles, and other relevant geometric information about the buildings and structures located within a geographic region. This pre-calculated information can then be used by any of the previously mentioned embodiments to accelerate the process of obtaining roof estimates within that geographic region.

It should be understood, that the system and method described herein may be used by any individual or company that would find the calculation of the size, geometry, pitch and orientation of the roof of a building from aerial images of the building useful. Such companies may include roofing companies, solar panel installers, roof gutter installers, awning companies, HVAC contractors, general contractors and insurance companies.

DESCRIPTION OF THE PREFERRED EMBODIMENT(S)

Figure 3:
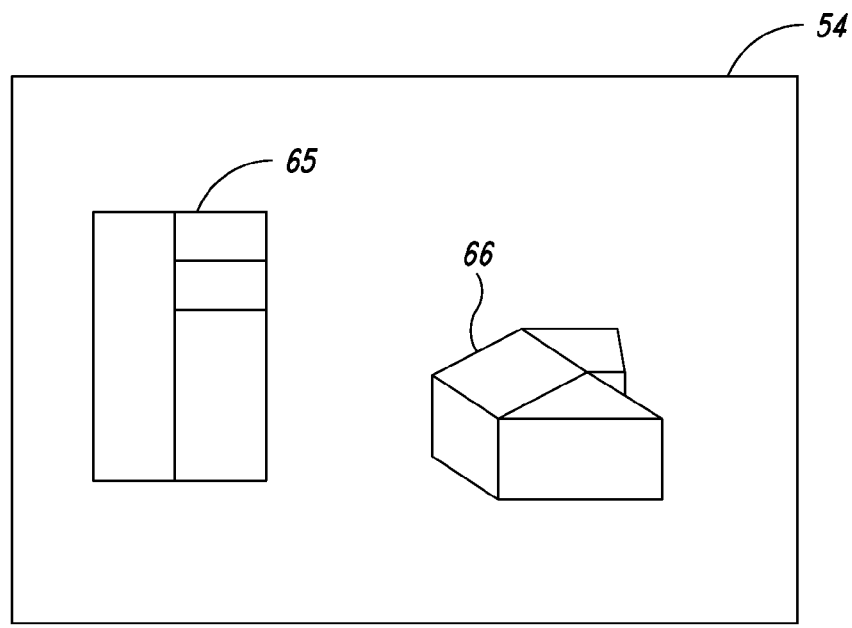
FIG. 3 is an illustration showing the top and perspective view of a house for a particular address.

Referring to the accompanying Figures, there is described a system 10 and method that allows a roof company 70 to provide a final estimate 102 to a potential customer 90 to install equipment or to repair or replace the roof on a building 92 using aerial images of the building 92. The system 10 includes an estimating software program 50 designed to receive an address for the building 92. The software program 50 is linked to an aerial image file database 52 that contains aerial images files 54 of various building 92 in a region. The aerial image files 54 may be taken any available means, such as an aircraft, balloon, a satellite, etc. As shown in FIG. 3, the image files 54 typically include at least one a top plan view 65 and a perspective view 66 of the building 92. The image files 54 may also include a wide angle image file 67 showing the building 92 and the surrounding areas 67 around the building 92. In one embodiment, an image analysis and calibration module 56 is linked to the software program 50 that enables the roof company 70 to closely estimate the dimensions and slopes of the roofs of the buildings 92 shown in the views 65, 66. By simply inputting the customer's address into the software program 50, the roof company 70 is able view the customer's roof from the aerial image files 54 using a remote computer 72, determine the dimensions and slopes of the roof sections that make up the roof, and prepare a preliminary report 101 which is then used to prepare a final estimate 102 that is then delivered to the potential customer 90.

Figure 1:
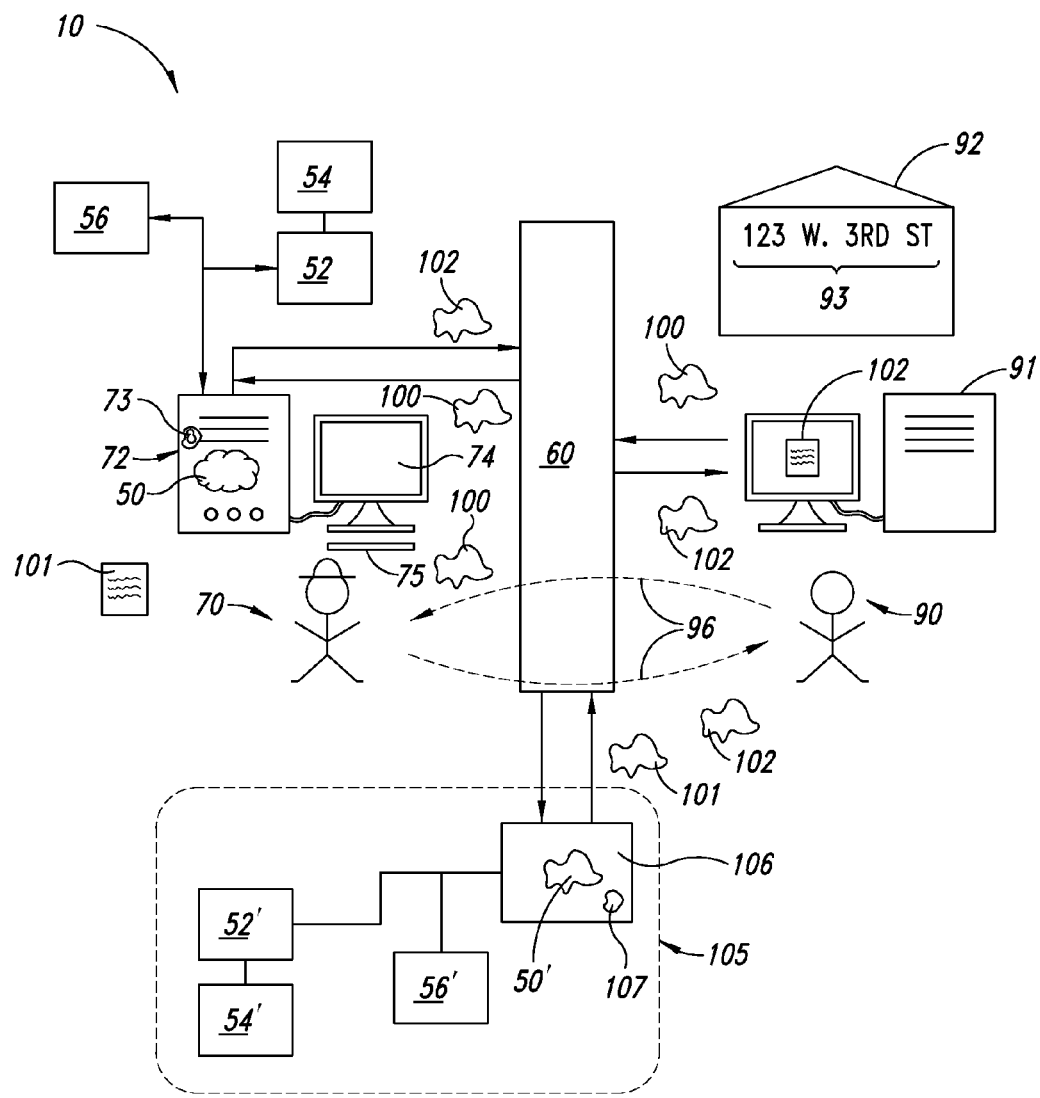
FIG. 1 is an illustration showing the system and method being used by a new customer requesting a roof estimate from a roof contractor who uses his or her computer to access a local or remote image database or from a roof contractor who contacts a remote aerial image or estimate provider and then provides a written estimate to the customer.

FIG. 1 is an illustration showing the system 10 used by a potential customer 90 requesting a roof estimate from a roof company 70 that uses the system 10 described above. The potential customer 90 may be the building tenant, owner or insurance company. The roof company 70 uses a computer 72 which may connect to a wide area network 60. The customer 90 contacts the roof company 70 via his or her computer 91 and the wide area network 60 or by a telecommunication network 96, and requests a roof estimate for his building 92 located at a public address 93. (i.e. 23 W. 3rd St). The roof company 70 then processes the request 100 which leads to a final estimate 102 being delivered to the potential customer's computer 91 or via email, fax or postal service to the potential customer 90.

Figure 4:
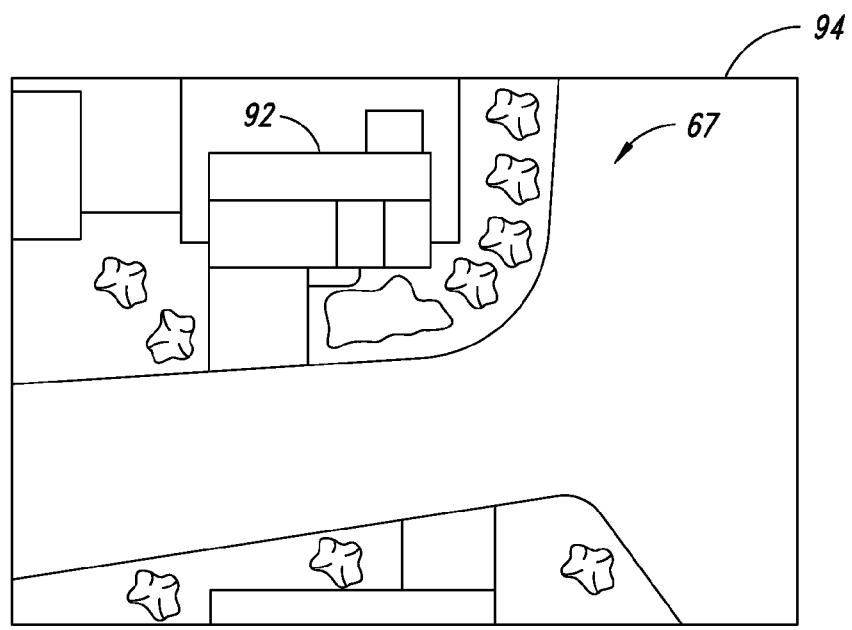
FIG. 4 is an aerial image of the home shown in FIG. 3 showing the areas and structures around the home.

There are several different ways the system 10 can be setup. FIG. 1 shows a first embodiment of the system 10 where the roof company 70 operates a remote computer 72 with a display 74 and a keyboard 75 or similar input means. A roof estimating software program 50 is loaded into the working memory 73 of the remote computer 72. The software program 50 is able to retrieve aerial images of buildings from the database 52 containing aerial images files 54 of buildings located in the region served by the roof company 70. In the first embodiment shown in FIG. 1, the remote computer 72 is linked or connected to a database 52 containing aerial images files 54 of the buildings. The software program 50 includes a calibration module 56 that enables the roof company 70 to determine the angles and dimensions of various roof sections shown in the images files 54. After the angles and dimensions are determined, the combined square footage of the building 92 can be determined which is then used to create a preliminary report 101. The roof company 70 then reviews the wide angle image file 94 (see FIG. 4) to determine if the building 92 has special access and clean up factors that may impact the final estimate 102. Once the preliminary report 101 or the final estimate 102 is prepared by the roof company 70, one or both can be transmitted to the customer 90 via the wide area network 60, the telecommunication network 96, or by postal service.

Also shown in FIG. 1 is an alternative setup of the system 10 wherein a preliminary report 101 is prepared by a separate roof estimating entity 105 which is then forwarded to the roof company 70 who then prepares the final estimate 102 and sends it to the customer 90. The entity 105 includes a computer 106 with a roof estimating software program 50' loaded into the working memory 107. Like the software program 50 loaded into the roof contractor's computer 72 in the previous embodiment the software program 50' is also able to retrieve aerial images of houses from a database 52' containing aerial images files 54' of houses located in the region served by the roof company 70. An optional calibration module 56' may be provided which enables the entity 105 to determine the angles and linear dimensions of various roof sections on the house 92.

When the system 10 is setup to include the estimating entity 105, the customer contacts the roofing company 70. The roof company 70 then contacts the estimating entity 105 and forwards the address of the building 92 thereto. The estimating entity 105 then prepares the preliminary report

101 that is transmitted to the roof company 70. The roof company 70 then prepares the final report 102 and sends it to the customer 90.

Figure 2:
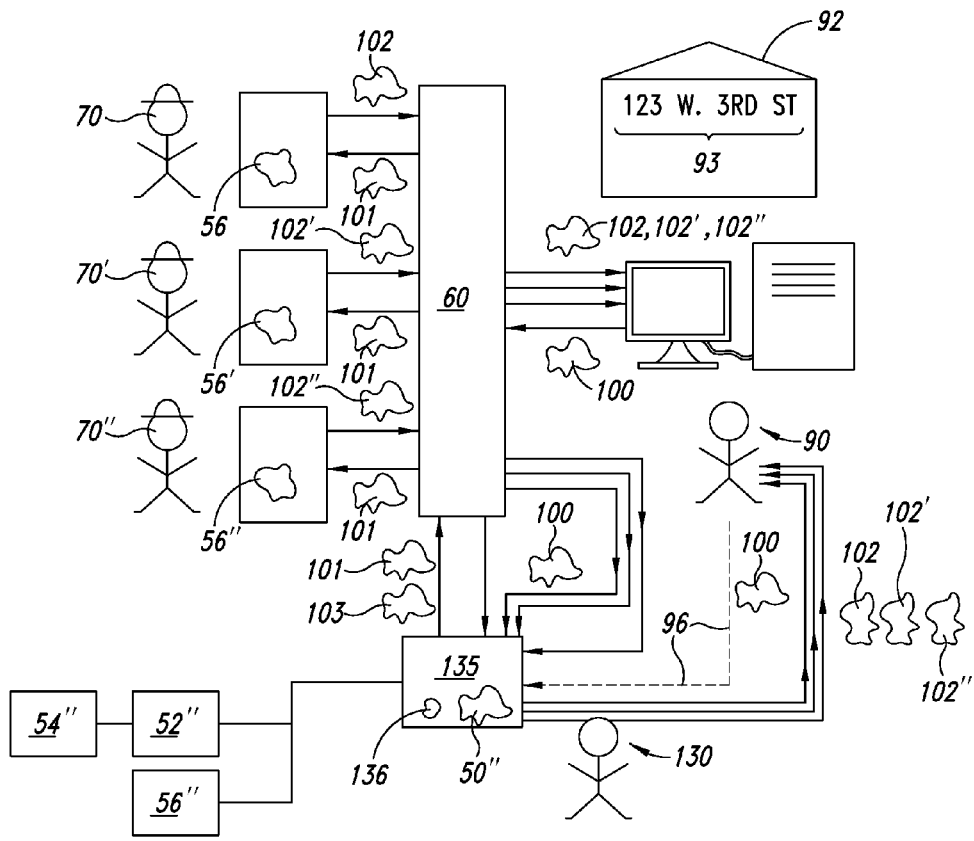
FIG. 2 is an illustration showing the system and method being used by a new customer requesting roof estimates from a plurality of roof contractors which are part of a referral service provided by a remote aerial image or estimate provider that transmits images or an intermediate report to all of the roof contractors who then individually prepare and transmit an estimate to the customer.

FIG. 2 shows a third embodiment of the system 10 where the customer 90 contacts a roof estimating entity 130 who receives a request 100 from the customer 90 via the wide area network 60 or telecommunication network 96. The roof estimating entity 130 prepares a preliminary report 101 which is then transmitted to various roof companies 70, 70', 70" associated with the entity 130. Accompanying the preliminary report 101 may be the name and contact telephone number(s) or email address of the customer 90. Each roof company 70, 70', 70" reviews the preliminary report 101 and any associated images sent therewith and then prepares a final estimate 102, 102', 102". The final estimate 102, 102', 102" is then mailed, emailed or faxed to the customer 90 or back to the estimating entity 130. The estimating entity 130 then sends the final estimate 102, 102', 102" to the customer 90. In this embodiment, the estimating entity 130 includes a computer 135 in which the roof estimating software program 50" is loaded into its working memory 136 loaded and linked to the aerial image database 52" containing image files 54". An optional calibration module 56" may be loaded into the working memory 136 of the computer 135.

Figure 5A:
FIGS. 5A-F are consecutive pages from a preliminary or final report sent to a potential customer prepared by the roofing company.
Figure 5B:
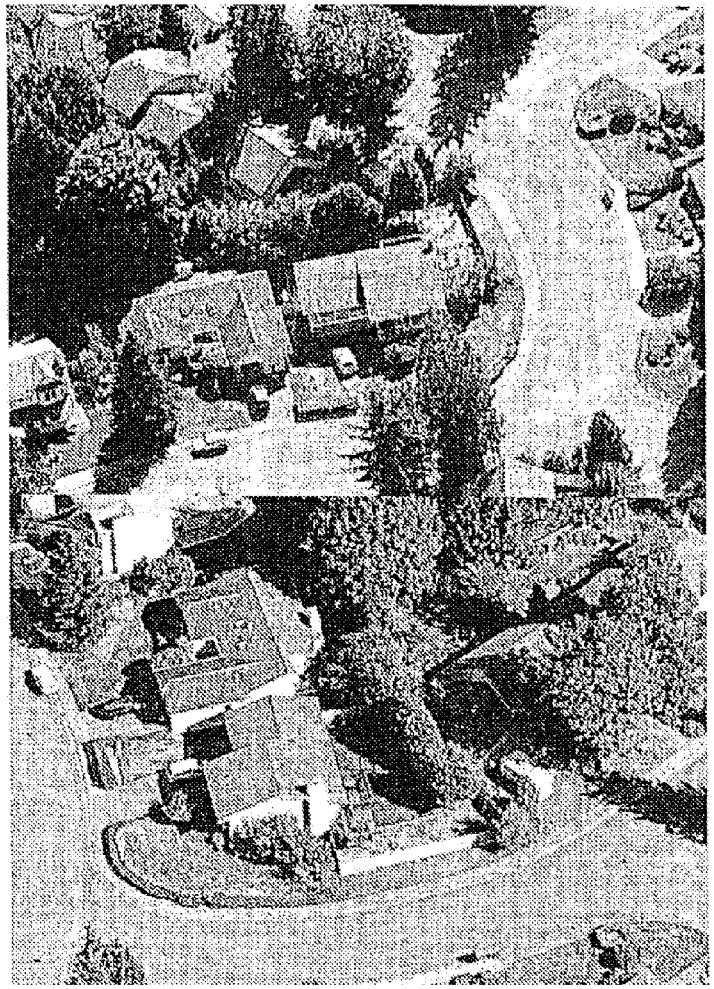
Figure 5C:
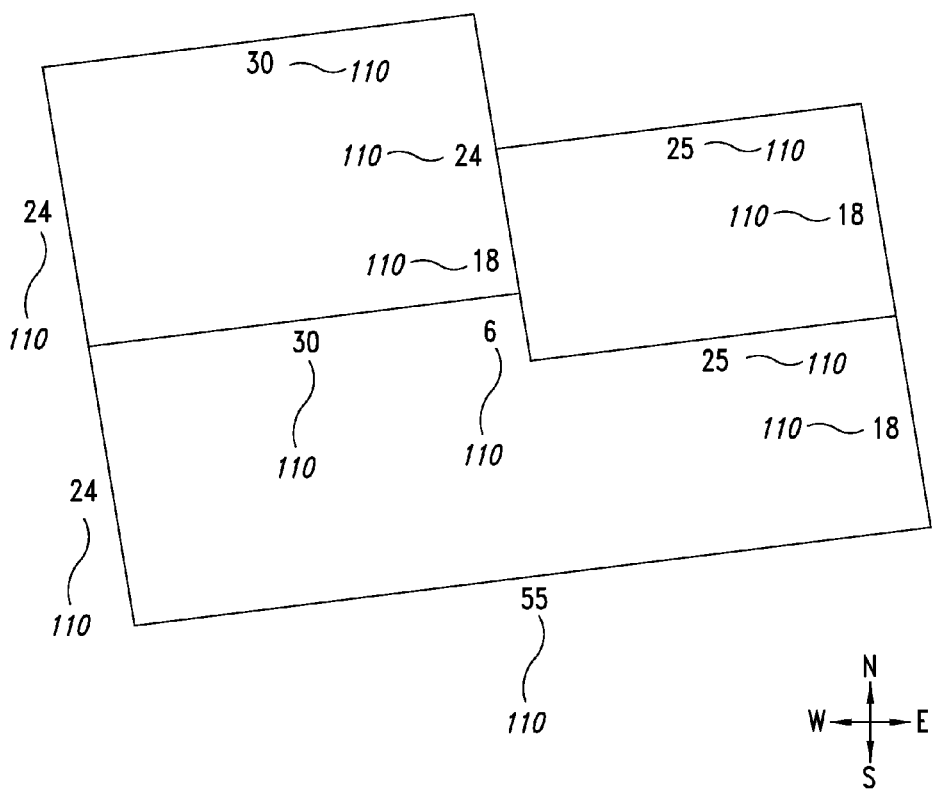
Figure 5D:
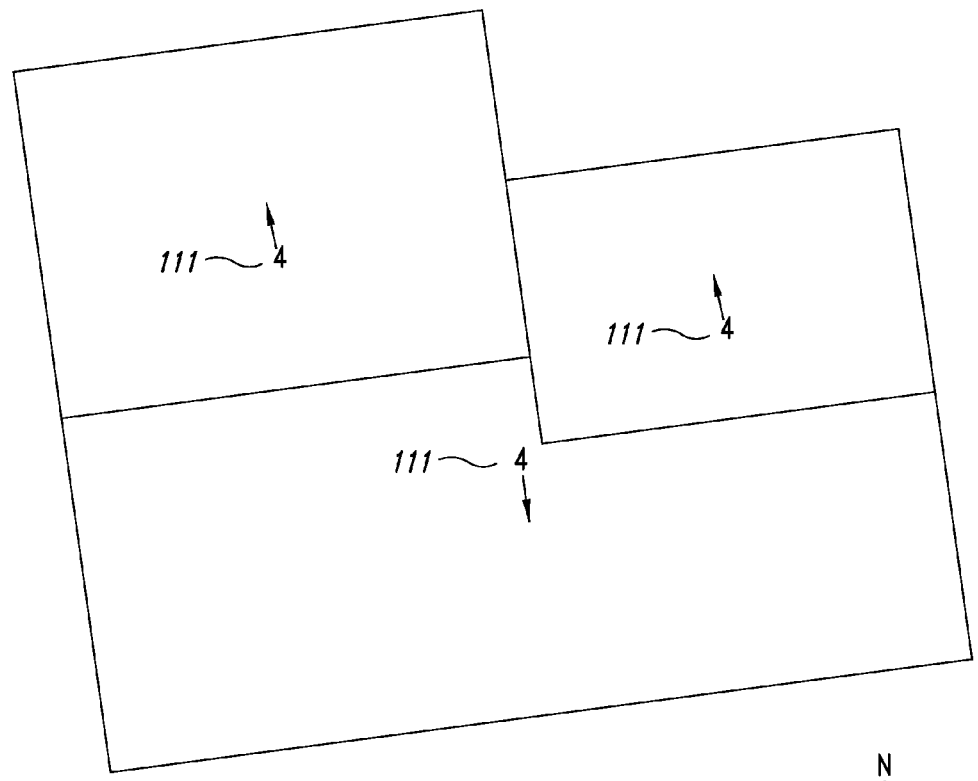
Figure 5E:
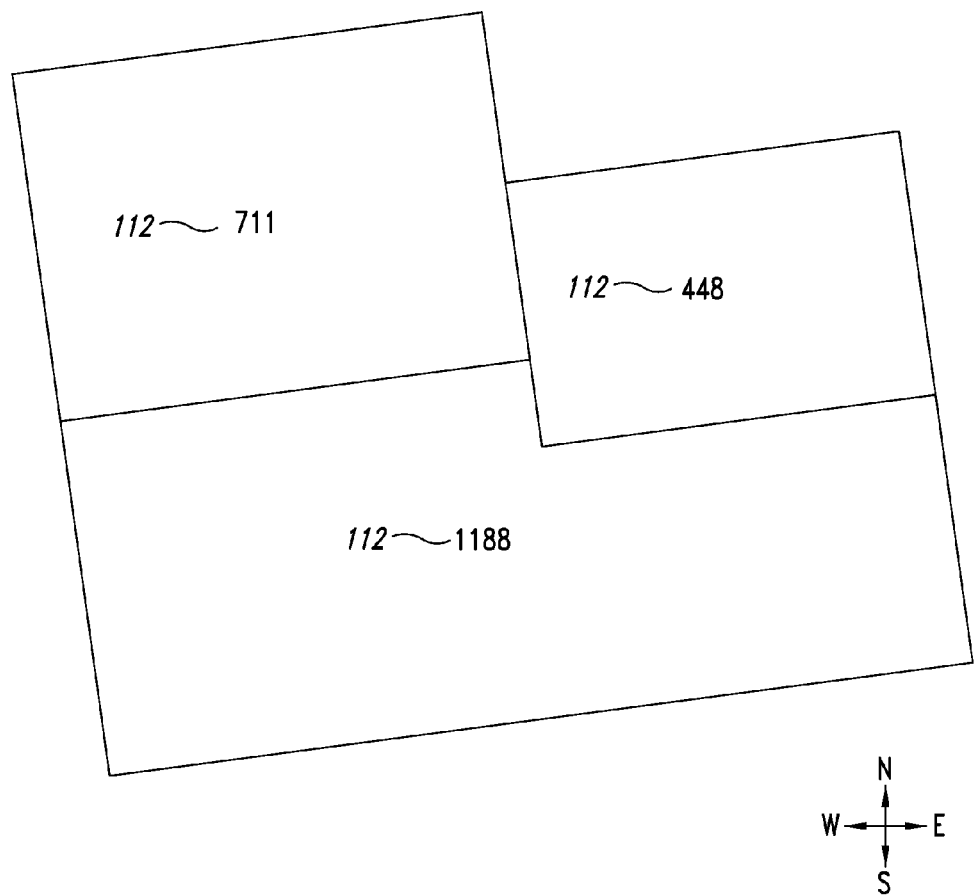
Figure 5F:
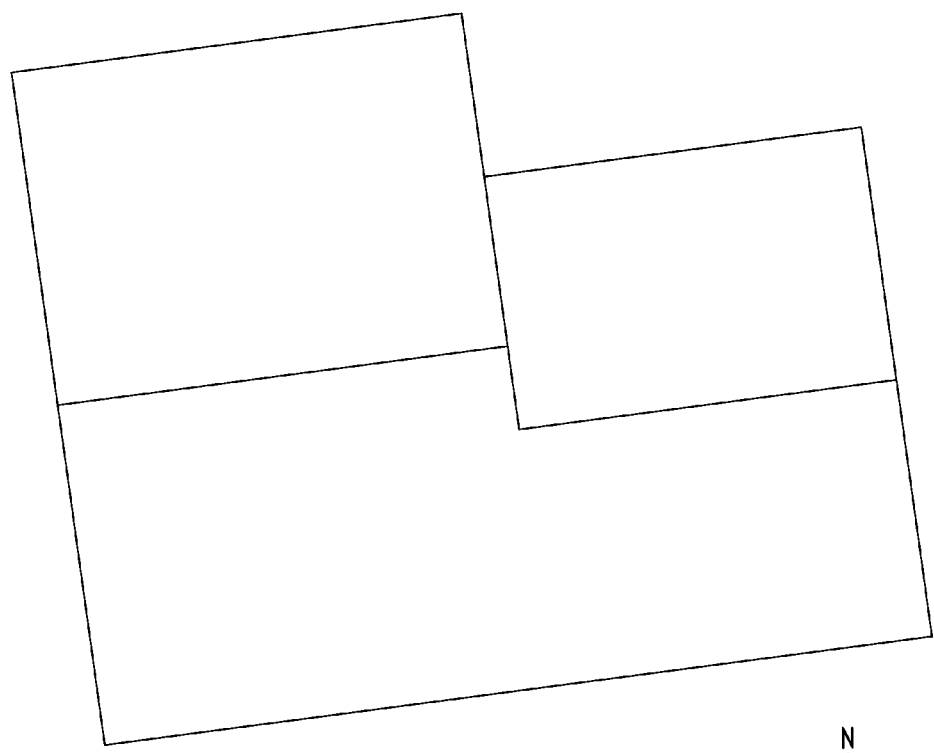

FIGS. 5A-5F are individual pages that make up a representative report. In FIG. 5A, a cover page 103 lists the address of the building and an overhead aerial image of the building. In FIG. 5B, a second page 104 of the report is shown that shows wide overhead perspective view of the building at the address with the surrounding areas more clearly shown. FIG. 5C is the third page 106 of the report which shows a line drawing of the building showing ridge and valley lines, dimensions 110 and a compass indicator. FIG. 5D is an illustration of the fourth page 107 of the report showing the pitch angle 111 of each roof section along with a compass indicator. FIG. 5E is an illustration of the fifth page 108 of the report showing the square footage 112 of each roof section along with the total square foot area value. FIG. 5F is an illustration of a sixth page 109 of the report showing an overall, aerial line drawing of the building where notes 113 or written comments may be written.

Using the above system, a detailed description of how the system is used is now provided.

First, a property of interest is identified by a potential customer of the service. The customer contacts the service with the location of the property. Typically, this will be a street address. The service then uses a geo-coding provider to translate the location information (such as a street address) into a set of coordinates that can be used to query an aerial or satellite image database. Typically, the geo-coding provider will be used to translate the customer supplied street address into a set of longitude-latitude coordinates.

Next, the longitude-latitude coordinates of the property are then used to query an aerial and/or satellite imagery database in order to retrieve one or more images of the property of interest. It is important to note that flat roofs only require a single image of the property. Roofs containing one or more pitched sections typically require two or more photographs in order to identify and measure all relevant sections and features of the roof.

Once the images of the roof section of the building are obtained, at least one of the images needs to be calibrated. During calibration, the distance in pixels between two points on the image is converted into a physical length. This calibration information is typically presented as a scale marker on the image itself, or as additional information supplied by the image database provider along with the requested image.

The image(s) and calibration information returned by the imagery database is entered or imported into the service's measurement software.

A set of reference points are identified in each of the images. The service's measurement software then uses these reference points and some proprietary algorithms to co-register the images and reconstruct the three dimensional geometry of the object identified by the reference points. There are a variety of photo-grammetric algorithms that can be utilized to perform this reconstruction. One such algorithm used by the service uses photographs taken from two or more view points to 'trangulate' points of interest on the object in 3D space. This triangulation can be visualized as a process of projecting a line originating from the location of the photograph's observation point that passes through a particular reference point in the image. The intersection of these projected lines from the set of observation points to a particular reference point identifies the location of that point in 3D space. Repeating the process for all such reference points allows the software to build a 3D model of the structure.

The optimal choice of reconstruction algorithm depends on a number of factors such as the spatial relationships between the photographs, the number and locations of the reference points, and any assumptions that are made about the geometry and symmetry of the object being reconstructed. Several such algorithms are described in detail in textbooks, trade journals, and academic publications.

Once the reconstruction of the building is complete, the results are reviewed for completeness and correctness. If necessary, a user of the service's software will make corrections to the reconstructed model.

Information from the reconstructed model is used to generate a report containing information relevant to the customer. If the report is meant for delivery to a roofing company, the information in the report may include total square footage, square footage 112 and pitch 111 of each section of roof, linear measurements 110 of all roof segments, identification and measurement of ridges and valleys, and different elevation views rendered from the 3D model (top, side, front, etc).

Using the above description, a method for estimating the size and the repair or replacement costs of a roof comprising the following steps:

a. selecting a roof estimation system that includes a computer with a roof estimation software program loaded into its working memory, said roof estimation software uses aerial image files of buildings in a selected region and a calibration module that allows the size, geometry, and orientation of a roof section to be determined from said aerial image files;

b. submitting a request for a measurement of a roof of a building at a known location;

c. submitting the location information of a building with a roof that needs a size determination, a repair estimate, or replacement estimate;

d. entering the location information of said building and obtaining aerial image files of one or more roof sections used on a roof; and, e. using said calibration module to determine the size, geometry and pitch of each said roof section.

In the above method, the entity requesting the measurement is the building tenant, the building owner, or the insurance request.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A system for remotely determining measurements of a roof, comprising:
   a computer including an input means, a display means and a non-transitory memory; and
   a roof estimation software program stored in the non-transitory memory and operable to cause a processor of the computer to:
      receive location information of a building in a selected region;
      receive image files representing a plurality of distinct roof sections of a roof of said building;
      determine, measurements of the roof including size, dimensions, and pitch of the plurality of distinct roof sections of the roof of said building based solely on the received image files; and
      outputting a report having the determined measurements therein.

2. The system as recited in claim 1, further comprising an image file database containing a plurality of images of roofs of buildings, the image file database loaded into said non-transitory memory of said computer.

3. The system as recited in claim 1, wherein the roof estimation software program stored in the non-transitory memory is further operable to cause the processor of the computer to access an image file database that is located on a second computer that is remote from said computer.

4. The system as recited in claim 1, wherein the roof estimation software program stored in the non-transitory memory is further operable to cause the processor of the computer to receive a request for an estimate at said computer from remote locations.

5. A system for remotely determining measurements of a roof, comprising:
   a computer including an input means, a display means and a non-transitory memory; and
   a roof estimation software program stored in the non-transitory memory and operable to cause a processor of the computer to:
      receive location information of a building in a selected region;
      receive image files representing a plurality of distinct roof sections of a roof of said building;
      determine, measurements of the roof including size, dimensions, and pitch of the plurality of distinct roof sections of the roof of said building based solely on the received image files; and
      produce a roof construction estimate based on the determined measurements.

6. The system as recited in claim 1, wherein the roof estimation software program is further operable to cause the processor of the computer to produce an HVAC installation estimate based on the determined measurements.

7. The system as recited in claim 1, wherein the roof estimation software program is further operable to cause the processor of the computer to produce a solar panel installation estimate based on the determined measurements.

8. A system for remotely determining measurements of a roof, comprising:
   a computer including an input means, a display means and a non-transitory memory; and
   a roof estimation software program stored in the non-transitory memory and operable to cause a processor of the computer to:
      receive location information of a building in a selected region;
      receive image files representing a plurality of distinct roof sections of a roof of said building; and
      determine, measurements of the roof including size, dimensions, and pitch of the roof sections of the roof of said building based solely on the received image files; and
      produce a roof gutter installation estimate based on the determined measurements.

9. A system for remotely determining measurement of a roof, comprising:
   a computer including an input means, a display means and a non-transitory memory; and
   a roof estimation software program stored in the non-transitory memory and operable to cause a processor of the computer to:
      receive location information of a building in a selected region;
      receive image files representing roof sections of a roof of said building; and
      determine, measurements of the roof including size, dimensions, and pitch of the plurality of distinct roof sections of the roof of said building based solely on the received image files; and
      produce a repair or replacement estimate based on the determined measurements.

10. A method for determining measurements of a roof, comprising:
    receiving, by a roof computer system, a request for a measurement of a roof of a building;
    receiving, by the roof system, a location of the building;
    determining by a calibration module of the roof computer system, measurements of the roof including size, dimensions and pitch of a plurality of distinct roof sections of the building based solely on image files of said roof of the building at said location; and
    generating, by the roof computer system, a roof report based on the determined measurements; and outputting the generated roof report.

11. The method of claim 10, wherein receiving the request for the measurement includes receiving the request from at least one of: a building tenant, a building owner, a roofing contractor, a solar panel installation company, a gutter installation company, an HVAC company, and an insurance company.

12. The method of claim 10 wherein generating the roof estimate report includes generating a line drawing of the roof labeled with at least one of the determined measurements.

13. The method of claim 10 wherein the roof estimate report includes at least one image based on at least one of the image files.

14. The method of claim 10 wherein determining the measurements of the roof includes constructing, based on the image files, a three-dimensional geometry of the roof.

15. The method of claim 14 wherein constructing the three-dimensional geometry of the roof includes co-registering, based on a set of reference points, at least two images based on the image files.

16. The method of claim 10 wherein determining the measurements of the roof includes determining linear measurements of the roof sections.

17. The method of claim 10 wherein determining the measurements of the roof includes identifying ridges or valleys of said roof.

18. The method of claim 10 wherein receiving the request for the measurement of the roof includes receiving, from a customer, an address of said building.

19. The method of claim 10 further comprising obtaining receiving the image files of said roof includes from an image database.

20. A method for determining measurements of a roof, comprising:
receiving a request for measuring a roof of a building, the request including location information for the building, the roof including a plurality of distinct sections;
receiving, based on the location information, image files representing a plurality of distinct roof sections of the roof of the building; and
determining, by a roof estimation computer system, the measurements of the roof based solely on the received image files, the measurements including a pitch of each of the plurality of distinct sections of the roof.

21. A method for determining measurements of a roof, comprising:
receiving a request for measuring a roof of a building, the request including location information for the building, the roof including a plurality of distinct sections;
receiving, based on the location information, image files representing a plurality of distinct roof sections aerial images of the roof of the building;
determining, by a roof estimation computer system, the measurements of the roof based solely on the received image files, the measurements including an area and a pitch of each of the plurality of sections of the roof; and
producing a roof estimate report based on the determined measurements of the roof.

22. The method of claim 21 wherein the roof estimate report includes a line drawing of the roof labeled with at least one of the determined measurements.

23. The method of claim 20 wherein determining the measurements of the roof includes constructing, based on the image files, a three-dimensional geometry of the roof.

24. The method of claim 23 wherein constructing the three-dimensional geometry of the roof includes co-registering, based on a set of reference points, aerial images based on the image files.

25. The method of claim 20 wherein receiving the image files representing a plurality of distinct roof sections aerial images of the roof includes receiving the image files from an aerial-image database.

26. A system for remotely determining measurements of a roof, the system comprising:
a computer including a display and a non-transitory memory; and
a roof estimating software program stored in the non-transitory memory and operable to:
receive location information of a building in the selected region;
receive image files representing a plurality of distinct roof sections of a roof of said building;
present on the display images showing the plurality of distinct roof sections of said building based on the received image files;
determine, the measurements of the roof including size, dimensions, and pitch of the plurality of distinct roof sections of said building based solely on the received image files; and
output a report including the determined measurements.

27. The system of claim 26 further comprising an image file database that includes the received image files.

28. A method for determining measurements of a roof, comprising:
receiving a request for measuring a roof of a building, the request including location information for the building, the roof including a plurality of distinct sections;
receiving image files representing the plurality of distinct sections of the roof of the building from a remote aerial-image database, the receiving based on the location information for the building;
determining, by a roof estimation computer system, the measurements of the roof based solely on the received image files, the measurements including an area and a pitch of each of the plurality of distinct sections of the roof;
identifying, based on the received image files, ridges of the roof; and
outputting a roof estimate report based on the determined measurements of the roof, the roof estimate report including at least some of the determined measurements.

29. The method of 28 wherein determining the measurements of the roof includes constructing, based on the image files, a three-dimensional geometry of the roof.

30. The method of claim 28 wherein constructing the three-dimensional geometry of the roof includes co-registering, based on a set of reference points, images of the roof.

31. The method of claim 28, wherein receiving the request for measuring the roof includes receiving the request from at least one of: a building tenant, a building owner, a roofing contractor, a solar panel installation company, a gutter installation company, an HVAC company, and an insurance company.

32. A method for providing a roof report comprising:
receiving image files of a roof having a plurality of distinct sections, the received image files representing the plurality of distinct sections;
determining, by a computer system, roof pitch measurements by constructing a three-dimensional geometry of the roof based solely on the received image files;
generating a first image of the roof showing a plan view of the roof, the generated image including a first set of lines representing the sections of the roof on the first generated image;
indicating the roof pitch measurements on the first generated image, said roof pitch measurements determined by the reconstructed three dimensional geometry and said roof pitch measurements showing a pitch of at least one of the sections within a section of the roof having the pitch; and
outputting a roof report including the first generated image.

33. The method of claim 32 wherein said roof pitch measurements show, within each section, a pitch of the section.

34. The method of claim 32 further comprising:
indicating roof area measurements on the roof report, said roof area measurements determined by the reconstructed three dimensional geometry and showing an area of at least one of the sections within a section of the roof having the area.

35. The method of claim 32 further comprising:
indicating roof area measurements on the roof report, said roof area measurements determined by the reconstructed three dimensional geometry and showing, within each section, an area of the section.

36. The method of claim 35 wherein the indicating roof area measurements on the roof report comprises indicating roof area measurements on the roof report on a second generated image of the roof included in the roof report different than the first generated image.

37. The method of claim 36 wherein the indicating roof area measurements on the roof report on a second generated image of the roof included in the roof report different than the first generated image comprises:
generating the second image of the roof showing a plan view of the roof, the generated second image including a second set of lines representing the sections of the roof on the second generated image; and
indicating roof area measurements on the second generated image, said roof area measurements determined by the reconstructed three dimensional geometry and showing an area of at least one of the sections within a section of the roof having the area, and wherein the outputted roof report includes the first and second generated images.

38. The method of claim 32 further comprising:
indicating roof dimension measurements on the roof report, said roof dimension measurements determined by the reconstructed three dimensional geometry and showing an approximate actual length of a sloped edge of a roof section proximate to a line of the first set of lines, said line representing the sloped edge.

39. The method of claim 32 further comprising:
indicating roof dimension measurements on the roof report, said roof dimension measurements determined by the reconstructed three dimensional geometry and showing, proximate to each line of the first set of lines, a dimension of a roof section represented by the line.

40. The method of claim 39 wherein the indicating roof dimension measurements on the roof report comprises indicating roof dimension measurements on the roof report on a second generated image of the roof included in the roof report different than the first generated image.

41. The method of claim 40 wherein the indicating roof dimension measurements on the roof report on a second generated image of the roof included in the roof report different than the first generated image comprises:
generating the second image of the roof showing a plan view of the roof, the generated second image including a second set of lines representing the sections of the roof on the second generated image; and
indicating roof dimension measurements on the second generated image, said roof dimension measurements determined by the reconstructed three dimensional geometry and showing an approximate actual length of a sloped edge of a roof section proximate to a line of the second set of lines, said line representing the sloped edge, and wherein the outputted roof report includes the first and second generated images.

42. The method of claim 32 wherein the generated first image of the roof is a line drawing.

43. A method for providing a roof report comprising:
receiving aerial image files of a roof having a plurality of distinct sections, the received image files representing the plurality of distinct sections;
determining, by a computer system, roof area and pitch measurements by constructing a three-dimensional geometry of the roof based solely on the received aerial image files;
generating a first image of the roof showing a plan view of the roof, the generated image including a first set of lines representing the sections of the roof on the first generated image;
indicating the roof area measurements on the first generated image, said roof area measurements determined by the reconstructed three dimensional geometry and said roof area measurements showing an area of at least one of the sections within a section of the roof having the area; and
outputting a roof report including the generated first image.

44. The method of claim 43 further comprising:
indicating roof dimension measurements on the roof report, said roof dimension measurements determined by the reconstructed three dimensional geometry and showing, proximate to each line of the first set of lines, a dimension of a roof section represented by the line.

45. The method of claim 44 wherein the indicating roof dimension measurements on the roof report comprises indicating roof dimension measurements on the roof report on a second generated image of the roof included in the roof report different than the first generated image.

46. The method of claim 43 wherein the generated first image of the roof is a line drawing.

47. A method for providing a roof report comprising:
receiving aerial image files of a roof having a plurality of distinct sections, the received aerial image files representing the plurality of distinct sections;
determining, by a computer system, roof pitch measurements, roof area measurements and roof dimension measurements by constructing a three-dimensional geometry of the roof based solely on the received aerial image files;
generating a first, second and third image of the roof, the generated images each showing a plan view of the roof, and each including a set of lines representing the sections of the roof;
indicating the roof pitch measurements on the first image, said roof pitch measurements determined by the reconstructed three dimensional geometry and said roof pitch measurements showing a pitch of at least one of the sections within a section of the roof having the pitch;
indicating roof area measurements on the second image, said roof area measurements determined by the reconstructed three dimensional geometry and showing an area of at least one of the sections within a section of the roof having the area;
indicating roof dimension measurements on the third image, said roof dimension measurements determined by the reconstructed three dimensional geometry and showing an approximate actual length of a sloped edge of a roof section proximate to a line of the set of lines included on the third image, said line representing the sloped edge; and
outputting a roof report including the first second and third images.

48. The method of claim 47 wherein said roof pitch measurements show, within each of the sections of the roof shown on the first image, a pitch of the section, wherein said roof area measurements show, within each of the sections of the roof shown on the second image, an area of the section, and wherein said roof dimension measurements show, proximate to each line of the set of lines included on the third image, a dimension of a roof section represented by the line.

49. The method of claim 48 wherein the first, second and third images of the roof are line drawings.

50. A system for providing a roof report comprising:
a computer including a processor; and
a non-transitory memory operably coupled to the processor, the non-transitory memory having computer executable instructions stored thereon that, when executed by the processor, cause the processor to:

receive aerial mage files of a roof having a plurality of distinct sections, the received aerial image files representing the plurality of distinct sections;

determine roof pitch measurements, roof area measurements and roof dimension measurements with the computer and processor based solely on the received aerial image files;

generate at least one image of the roof, the image showing a line drawing of the roof, and the plurality of the sections of the roof;

indicate the roof pitch measurements on at least one image of the roof, said roof pitch measurements determined by the reconstructed three-dimensional geometry and said roof pitch measurements showing a pitch of at least one of the sections within a section of the roof having the pitch;

indicate roof area measurements on at least one image of the roof, said roof area measurements determined by the reconstructed three-dimensional geometry and showing an area of at least one of the sections within a section of the roof having the area;

indicate roof dimension measurements on at least one image of the roof, said roof dimension measurements determined by the reconstructed three-dimensional geometry and showing an approximate actual length of a sloped edge of a roof section proximate to a fine of the set of lines included on the third image, said fine representing the sloped edge; and output a roof report including the at least one image of the roof.

51. The system of claim 50 wherein said roof pitch measurements show, within each of the sections of the roof shown on the first image, a pitch of the section, wherein said roof area measurements show, within each of the sections of the roof shown on the second image, an area of the section, and wherein said roof dimension measurements show, proximate to each line of the set of lines included on the third image, a dimension of a roof section represented by the line.

52. The system of claim 51 wherein the at least one image of the roof is a plan view line drawing.

* * * * *

UNITED STATES PATENT AND TRADEMARK OFFICE
CERTIFICATE OF CORRECTION

| | | |
|---|---|---|
| PATENT NO. | : 8,145,578 B2 | Page 1 of 1 |
| APPLICATION NO. | : 12/148439 | |
| DATED | : March 27, 2012 | |
| INVENTOR(S) | : Chris Pershing et al. | |

It is certified that error appears in the above-identified patent and that said Letters Patent is hereby corrected as shown below:

Title Page,
Item (73):
"Eagel View Technologies, Inc., Redmond, WA (US)" should read, --Eagle View Technologies, Inc., Redmond, WA (US)--.

Item (56):
--6,323,885 B1 11/2001 Wiese 345/835--, has been omitted from the face of the patent.

Column 14, Line 6:
"of the set of lines included on the third image, said fine" should read, --of the set of lines included on the third image, said line--.

Signed and Sealed this
Fifteenth Day of May, 2012

David J. Kappos
*Director of the United States Patent and Trademark Office*